United States Patent [19]

Spangler

[11] Patent Number: 5,404,749

[45] Date of Patent: Apr. 11, 1995

[54] BORON DOPED SILICON ACCELEROMETER SENSE ELEMENT

[75] Inventor: Leland J. Spangler, Ann Arbor, Mich.

[73] Assignee: Ford Motor Company, Dearborn, Mich.

[21] Appl. No.: 43,671

[22] Filed: Apr. 7, 1993

[51] Int. Cl.$^6$ ...................... G01P 15/00; G01P 15/08
[52] U.S. Cl. ...................... 73/517 R; 73/514
[58] Field of Search ............... 73/517 R, 514, 517 B; 361/280, 283

[56] References Cited

U.S. PATENT DOCUMENTS

| | | | |
|---|---|---|---|
| 3,478,604 | 11/1969 | Evans | 73/517 |
| 3,498,138 | 3/1970 | Stewart | 73/517 |
| 4,483,194 | 11/1984 | Rudolf | 73/517 R |
| 4,598,585 | 7/1986 | Boxenhorn | 73/505 |
| 4,736,629 | 4/1988 | Cole | 73/517 R |
| 4,881,410 | 11/1989 | Wise et al. | 73/724 |
| 4,951,510 | 8/1990 | Holm-Kennedy et al. | 73/862.04 |
| 5,083,466 | 1/1992 | Holm-Kennedy et al. | 73/862.04 |
| 5,095,762 | 3/1992 | Holm-Kennedy et al. | 73/862.04 |
| 5,101,669 | 4/1992 | Holm-Kennedy et al. | 73/862.64 |
| 5,220,835 | 6/1993 | Stephan | 73/517 R |
| 5,233,213 | 8/1993 | Marek | 73/517 A |

FOREIGN PATENT DOCUMENTS

4224383A1 1/1993 Germany .
2158945 11/1985 United Kingdom .

OTHER PUBLICATIONS

"The Resistivity Dependence Of The Silicon Etch Rate And Anisotropy In KOH-IPA-H2O", by J. B. Price & William C. Roman, Electrochemical Society Extended Abstracts, Abstract No. 236, Fall 1972, pp. 584–586.
"Silicon Etch-Rate Dependence on Boron Concentration in Ethylenediamine-Pyrocatechol-Water Solutions", by N. F. Raley et al, J. Electrochem. Soc.: Solid-State Science and Technology, vol. 131, No. 1, Jan. 1984, pp. 161–171.
"Practical Silicon Etching Technology", by Chip Spangler and Khalil Najafi, University of Michigan, Jan. 1987, 10 pages.
"A 1024-Element High-Performance Silicon Tactile Imager", by K. Suzuki et al., IEEE 1988, pp. 674-IEDM thru 677-IEDM.
Solid-State Sensor And Actuator Workshop At Hilton Head Island, South Carolina, Jun. 6–9, 1988, Sponsored by the IEEE Electron Devices Society, IEEE Catalog No. 88TH0215-4 pp. 1–153.
"Fabrication and Characterization of Si Membranes", by E. D. Palik et al., J. Electrochem. Soc.: Solid-State Science and Technology, vol. 135, No. 12, Dec. 1988, pp. 3126–3134.
"Highly Selective KOH-Based Etchant For Boron--

(List continued on next page.)

Primary Examiner—Richard E. Chilcot, Jr.
Assistant Examiner—William L. Oen
Attorney, Agent, or Firm—Roger L. May; Daniel M. Stock

[57] ABSTRACT

A sense element is provided which has a boron doped silicon body positioned above and parallel to a substrate with a plurality of openings extending through the semiconductive body, the plurality of openings producing a damping such that the natural frequency and the measurement bandwidth of the sense element are modified. Also provided is a capacitive sense element for an accelerometer having a dielectric substrate with at least two fixed conductive plates thereon, a boron doped silicon body positioned above and parallel to the substrate, the body having a pedestal attached to the substrate and surrounded by an internal opening in the body, a first upper plate and a second upper plate corresponding to the fixed conductive plates to form a first and a second capacitor, and a pair of oppositely directed torsion arms connecting the body to the pedestal and forming a flexure axis around which the first and second upper plates deflect in response to an acceleration normal to the sense element to produce a difference between the capacitances of the first and second capacitors.

21 Claims, 3 Drawing Sheets

OTHER PUBLICATIONS

Doped Silicon Structures", by E. Bassous & A. C. Lamberti, Elsevier Science Publishers B.V., Microelectronic Engineering, vol. 9, 1989, pp. 167–170.

"A Novel Technique and Structure for the Measurement of Intrinsic Stress and Young's Modulus of Thin Films", by Khalil Najafi & Kenichiro Suzuki, IEEE, THO249-3, 1989, pp. 96–97.

"Strength Characterization of Silicon Microprobes in Neurophysiological Tissues", by Kalil Najafi & Jamille F. Hetke, IEEE Transactions On Biomedical Engineering, vol. 37, No. 5, May 1990, 8 pages.

Specifications of Model 1000 Capacitive Accelerometer, by Silicon Designs, Inc., Apr. 30,. 1992, 9 pages.

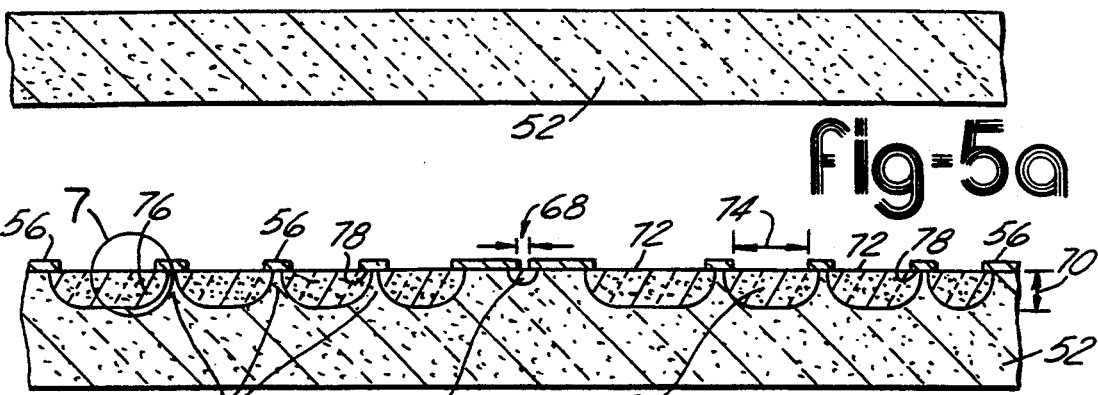
fig-5a
fig-5b
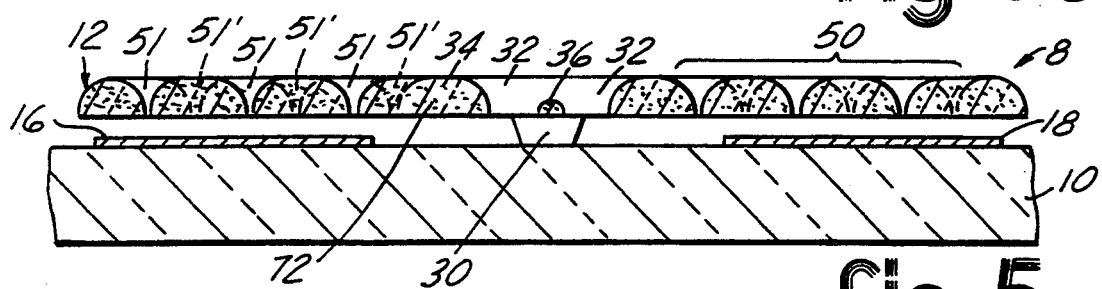
fig-5
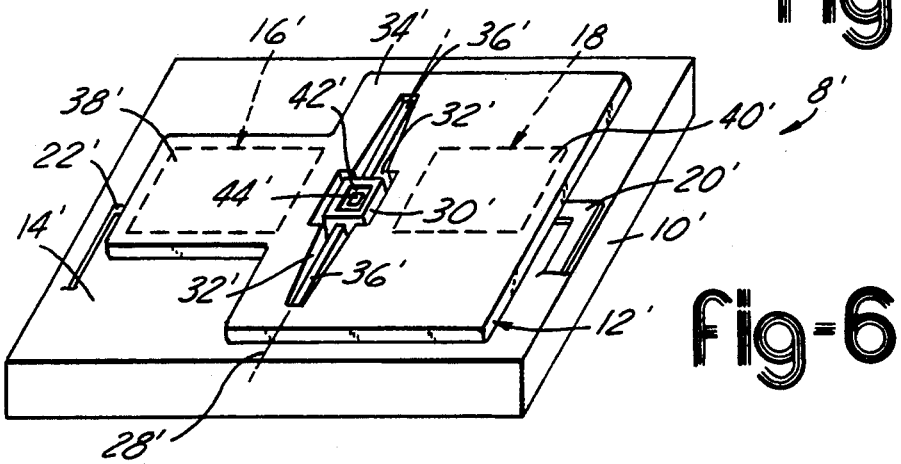
fig-6
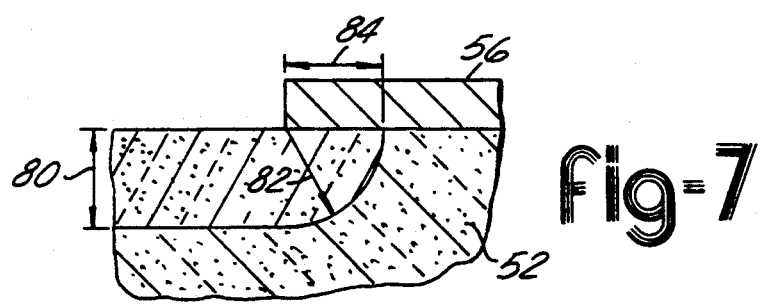
fig-7

BORON DOPED SILICON ACCELEROMETER SENSE ELEMENT

TECHNICAL FIELD

This invention relates to micro-miniature, solid state capacitive sense elements for use in accelerometers.

BACKGROUND ART

Transducers which translate nonelectrical quantities into electrical signals have long been known. These devices are designed to provide a usable output in response to a particular physical quantity, property or condition which is desired to be measured. The term 'sense element' has been used to define both the overall transducer as well as the transducer element which performs the first step in a multi-step translation process. For the purposes of the instant invention, the latter definition will govern.

Transducers with sense elements used to measure acceleration are known as accelerometers. Accelerometer applications in the automotive industry include incorporation into crash sensors for air bag deployment and ride motion sensors for active suspension components. Accelerometers also find use in the military and aerospace industries as rate of climb indicators and as components in smart weapons and missile arming devices.

Prior art sense elements have had difficulty in obtaining and maintaining the strength and response characteristics required by the rigorous working environment of such accelerometers. These sense elements relied heavily on cantilevered beams, seismic masses, and cylinder/ball arrangements affected by fluid pressure and traveling friction. These devices suffered from extreme fragility and breakage problems. In addition, it has often been difficult to make these prior art sense elements efficiently and economically, due to the rigors of large scale manufacturing processes. Finally, these devices often exhibit excess and undesired sensitivity in orthogonal axes.

U.S. Pat. No. 4,736,629 issued to Cole, (the U.S. Pat. No. '629 patent), and hereby incorporated by reference, discloses an accelerometer having a sense element comprised of a metallic upper plate having an internal opening surrounding a pedestal mounted to a semiconductor substrate. The pedestal is connected to the metallic plate by a pair of torsion members extending in opposite directions from the pedestal to the metallic plate. Fixed plates positioned on the semiconductor substrate correspond to portions of the metallic plate to form first and second capacitors. In response to acceleration normal to the substrate the metallic plate rotates around the flexure axis defined by the torsion members to vary the capacitance of the first and second capacitors.

The U.S. Pat. No. '629 patent expressly requires that the rotatable upper plate be made of metal and the substrate be a semiconductive material such as silicon. Although Cole teaches that the electrically conductive substrate will be covered with an insulating layer, the conductive nature of the substrate renders the disclosed sense element vulnerable to parasitic capacitance loss. As a result, Cole's sense element is potentially less accurate and less sensitive.

Cole also teaches that forming inertial elements from low density materials like silicon or silicon dioxide results in sense elements with less sensitivity to acceleration as compared with corresponding sense elements with inertial elements made of metal. The disclosure teaches that such semiconductive constructions are nonfeasible. Although admitting that the coefficient of thermal expansion of metal is significantly greater than that of silicon, Cole postulates that the structure of the U.S. Pat. No. '629 accelerometer sense element eliminates any bias due to differential thermal expansion or contraction. However, Cole fails to account for the effect of undesirable compressive stress induced in the torsion arms as a result of differential thermal expansion between the supporting pedestal and the underlying substrate.

In addition to undesirable stresses in the torsion arms, Cole's metallic upper plate is highly vulnerable to hysteresis and creep as well as plastic deformation from mechanical stresses. It will be appreciated that hysteresis defines lags or delays between the onset of acceleration and its resulting effect, i.e. the change in the relative capacitances, is highly undesirable in a sense element intended for use in applications requiring a high degree of accuracy and reliability, i.e. crash sensors for air bag deployment.

Even more importantly, Cole teaches that the sense element should be critically damped. However, this results in a sense element with a mechanical sensitivity which decreases the device's shock survivability. It will be appreciated that these characteristics make the use of a critically damped sense element highly undesirable in a crash sensor since such devices may be responsive to undesired signals.

It is thus an object of the present invention to achieve a sense element which solves the problems of the prior art, particularly with respect to the strength, survivability and response characteristics required of sense elements for accelerometers in general and particularly those used in automotive crash sensors for air bag deployment.

It is another object of the instant invention to provide a sense element having a measurement based width and a natural frequency and having incorporated therein a plurality of openings for modifying the natural frequency and the frequency response so as to produce a sense element having increased shock survivability.

Finally, it is also an object of the instant invention to provide a sense elements which has a structure and composition which substantially eliminates undesirable stresses resulting from differential thermal expansions or contractions and is free from hysteresis.

DISCLOSURE OF INVENTION

In general, the invention relates to a sense element having a substantially planar substrate with a semiconductive body positioned above and parallel to the substrate and having a plurality of openings extending through the body, such that the damping produced by the plurality of openings modifies the natural frequency and the frequency response of the sense element.

More particularly, the instant invention relates to a capacitive sense element for an accelerometer having a dielectric substrate with at least two fixed conductive plates thereon and a semiconductive pedestal attached to the substrate with a semiconductive body positioned above and parallel to the substrate and having an internal opening surrounding the pedestal. The semiconductive body has a first upper plate and a second upper plate with a plurality of openings extending therethrough with the upper plates corresponding to the fixed conductive plates to form first and second capacitors. A pair of oppositely directed torsion arms connect the body to the pedestal to form a flexure axis around which the first and second upper plates deflect or rotate in response to acceleration normal to the sense element to produce a difference between the capacitances of the first and second capacitors.

BRIEF DESCRIPTION OF DRAWINGS

FIG. 5 provides a side-cut-away view of the sense element of FIG. 2 taken along the line 5—5;

FIGS. 5A and B illustrate the sense element of FIG. 5 at two stages in the process of manufacturing;

FIG. 6 illustrates an alternative embodiment of the invention; and

FIG. 7 shows an expanded view of the circled portion of FIG. 5B.

BEST MODE(S) FOR CARRYING OUT THE INVENTION

This invention provides sense elements which surmount the problems of the prior art and are intended for in use in accelerometers generally and in crash sensor applications in particular. Advantages such as freedom from plastic deformation and stresses induced by differential thermal expansions and contractions, increased strength and improved manufacturing efficiency and economy are achieved with the use of a sense element comprised of a dielectric substrate and a boron doped silicon deflectable upper body. Prior art problems such as shock survivability and fragility have been solved with a unique structure which provides a sense element which is responsive to accelerations in the range of 0.5 to 1000 g, has a measurement bandwidth from 0 to 5000 Hertz, and a damping ratio from 2 to 20.

Figure 1:
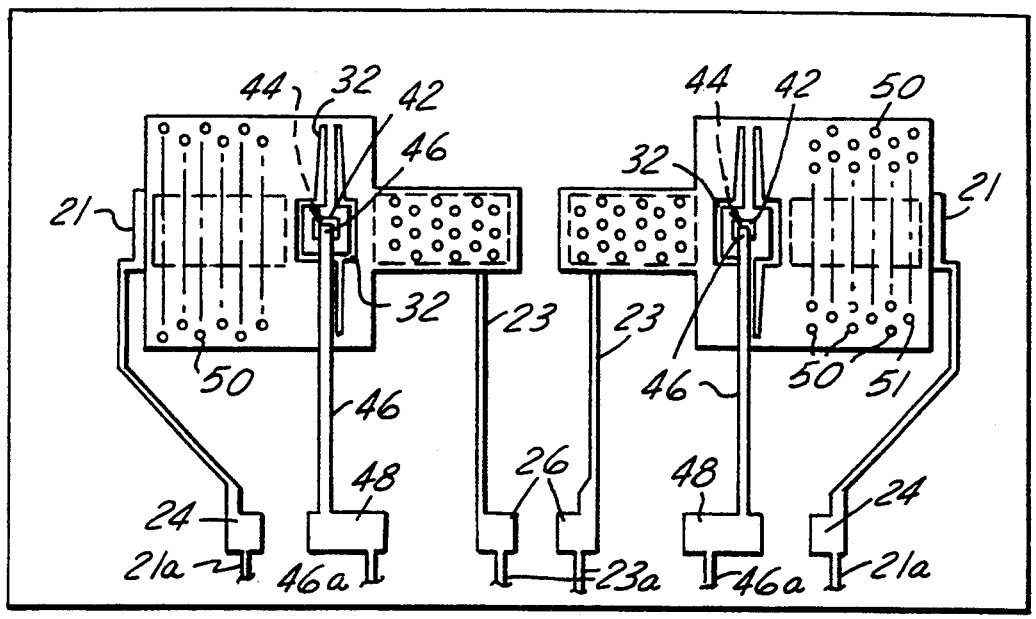
FIG. 1 shows a top view of the sense element portion of an accelerometer utilizing two sense elements of the instant invention.

Accordingly, while the preferred embodiment of the claimed sense element will utilize both aspects of this invention, it will be appreciated that each is directed toward distinct prior art problems. FIGS. 2, 3, 4, 5 and 7 illustrate a preferred embodiment of the claimed sense element. FIG. 6 illustrates an alternative embodiment of the instant invention. FIG. 1 illustrates the sense element portion of an accelerometer comprised of two of the sense elements of the instant invention.

Figure 2:
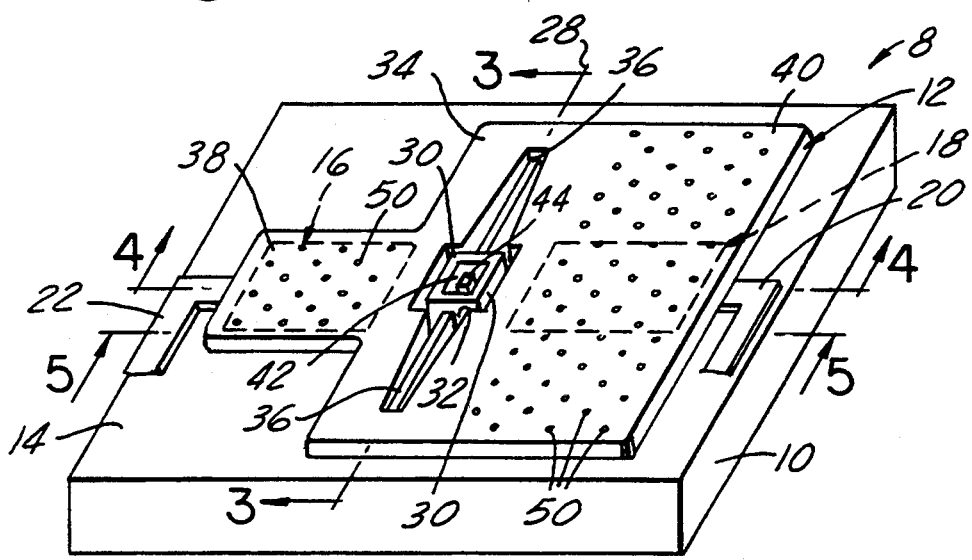
FIG. 2 provides a perspective view of the sense element of the instant invention.

Turning to FIG. 2, it will be seen that sense element 8 is a capacitive sense element comprised of substantially planar substrate 10 and deflectable upper body 12 which is positioned above and parallel to the substrate 10.

Substrate 10 is a solid dielectric material such as glass, ceramic, nitride or plastic. Most preferably, substrate 10 will be glass and will have a coefficient of thermal expansion very near that of silicon. A suitable glass for use as substrate 10 is Corning Code #7740 which is available from Dow Corning, located in Corning, N.Y., U.S.A. Substrate 10 will preferably have a thickness from 0.2 to 1.5 millimeters and most preferably will be from 0.5 to 0.8 microns ($\mu$) thick.

Figure 4:
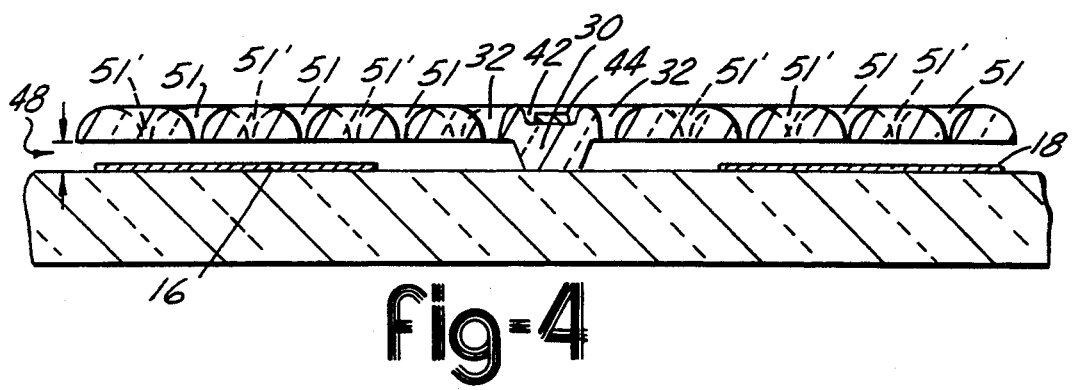
FIG. 4 provides a side-cut-away view of the sense element of FIG. 2 taken along the line 4—4.
Figure 4A:
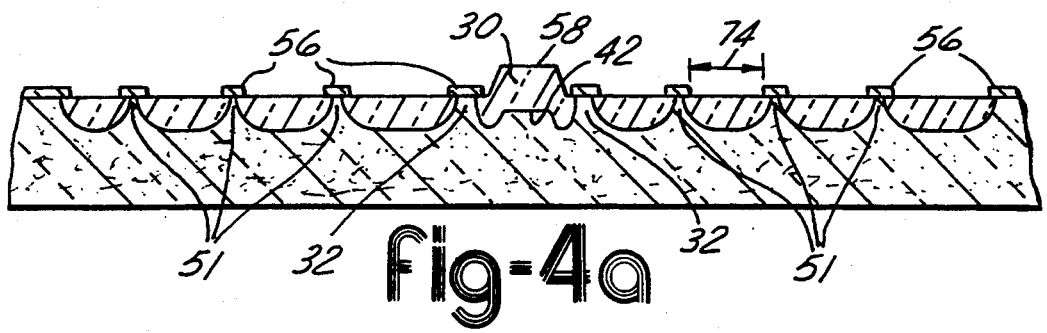
FIG. 4A illustrates the sense element of FIG. 4 at one stage of the manufacturing process.

Fixed conductive plates 16 and 18 are mounted on the substantially planar upper surface 14 of substrate 10 and may be seen in phantom in FIG. 2 or in the side views of FIGS. 4 and 5C. Fixed conductive plates 16 and 18 are comprised of metal and are preferably equal to one another in size and shape. Most preferably, they are positioned symmetrically with respect to flexure axis 28 and are smaller than upper plates 38 and 40. As will be discussed in greater detail below, upper plates 38 and 40 are those portions of deflectable upper body 12 which correspond to fixed plates 16 and 18 to form first and second capacitors.

While a variety of metals are suitable for the formation of fixed plates 16 and 18, a combination of metals will be preferably used. A suitable combination is chromium underlying platinum wherein chromium will have a thickness from 50 to 1000 Å and platinum will have a thickness from 50 to 3000 Å. Preferably, the chromium layer will be 150–300 Å thick and the platinum layer 500–1500 Å thick. Most preferably the chromium layer will 200°Å thick and the platinum layer 1000 Å thick. Those skilled in the art will appreciate that the total metal film thicknesses will range from between 100 Å to approximately 4000Å.

Also lying on the surface 14 are conductors 20 and 22, which connect fixed plates 16 and 18 to the rest of the transducer or accelerometer. While these electrical connections are also formed of metal, it is most preferred that they be of aluminum. Turning briefly to FIG. 1, it can be seen that conductors 21 and 23 are analogous to conductors 20 and 22. FIG. 1 also illustrates that conductors 21 and 23 connect to bond pads 24 and 26 from which conductors 21a and 23a ultimately connect the sense element 8 to the integrated circuitry which comprises the remainder of the accelerometer or transducer.

Returning to FIG. 2, deflectable body 12 is substantially planar and is positioned above upper surface 14 of substrate 10 so as to be parallel to upper surface 14 in the absence of both gravitational and acceleration forces normal to surface 14. Deflectable upper body 12 is comprised of pedestal 30 which is surrounded by internal opening 32 and connected to main body 34 by torsion arms 36. Main body 34 is substantially planar as discussed above and is comprised of upper plates 38 and 40 which are respectively positioned above fixed conductive plates 16 and 18 to form a first capacitor and a second capacitor. Deflectable upper body 12 will have a length from 0.1 to 10 millimeters and a width of approximately 0.05 to 5.0 millimeters. Most preferably, deflectable body 12 will have a length of approximately 1 millimeter and a width of approximately 0.5 millimeters.

Semiconductive deflectable upper body 12 will preferably have a shape such that upper plate 38 will have a total moment (i.e. mass times moment arm) about flexure axis 28 which is less than the total moment of upper plate 40. Thus, it will be appreciated that in response to acceleration normal to upper surface 14, deflectable body 12 will rotate about flexure axis 28, the degree of rotation or deflection being approximately proportional to the magnitude of the acceleration, and the degree of rotation or deflection corresponding to the direction of the acceleration.

Torsion arms 36 are positioned within internal opening 32 to connect pedestal 30 to main body 34 of semiconductive body 12. Torsion arms 36 form the flexure axis 28. In response to acceleration normal to upper surface 14, upper plates 38 and 40 will deflect or rotate about flexure axis 28 to produce a difference between the capacitances of the first and second capacitors respectively formed by fixed conductive plate 16 and upper plate 38 and fixed conductive plate 18 and upper plate 40.

Figure 3:
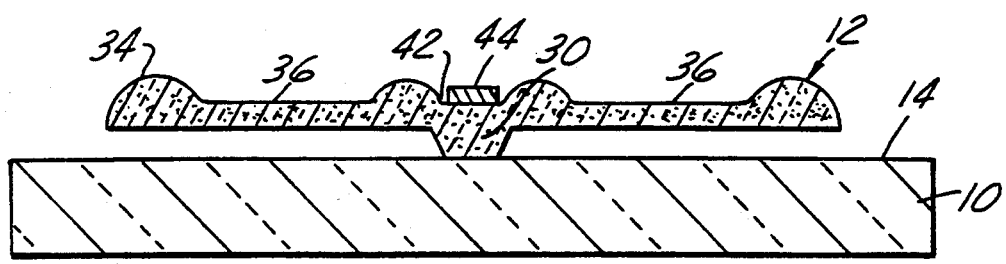
FIG. 3 illustrates a cross-sectional view of the sense element of FIG. 2 taken along the line 3—3.

Turning briefly to FIG. 3, it can be seen that pedestal 30 is attached to upper surface 14 of substrate 10. As will be discussed below, most preferably, pedestal 30 will be anodically bonded to substrate 10. Set within recess 42 of pedestal 30 is metal bond pad 44. Bond pad 44 most preferably will be of aluminum. Turning to FIG. 1, it can be seen that bond wire 46 connects bond pad 44 to bond pad 48. Conductor 48a leads to the integrated circuitry discussed above. Note that the various bond wire, bond pads etc. have been omitted from FIG. 2 to better illustrate other aspects of the claimed invention.

As illustrated in FIG. 6, deflectable upper body 12 is comprised of boron doped silicon. The use of boron doped silicon substantially eliminates the prior art problems of hysteresis and creep to increase the overall accuracy and reliability of sense element 8'. The density of the boron doped silicon used herein provides a sense element wherein upper plates 38 and 40 have sufficient mass and moment arm such that the sensitivity of sense element 8 can be controlled and a desirable level achieved.

The silicon of deflectable body 12 will preferably have a boron concentration of $1 \times 10^{19}$ cm$^{-3}$ or greater. Turning to FIG. 4, the boron concentration should be symmetric with respect to a plane 13. Plane 13 is substantially parallel to the surface of upper plates 38 and 40 and lies at a point of approximately $\frac{1}{2}$ of the total desired thickness of deflectable body 12. While there may be some change in boron concentration over the thickness 17 of deflectable body 12, the boron concentration should not be less than $1 \times 10^{19}$ cm$^{-3}$. The higher the differential mass of upper plates 38 and 40 the greater the sensitivity of sense element 8.

The use of boron doped silicon to form deflectable body 12 not only provides the performance advantages of the metallic upper plate disclosed in the U.S. Pat. No. '629 patent, but also eliminates problems such as hysteresis and creep as well as non-desirable plastic deformation resulting from high stress conditions and mechanical forces. Hysteresis is eliminated because a single-crystal silicon wafer with no grain boundaries is utilized for the formation of the boron doped silicon deflectable body 12. The unique property of silicon to exhibit no plastic deformation until catastrophic failure is responsible for the elimination of creep.

The use of the boron doped silicon and the dielectric substrate substantially reduces stresses caused by the use of materials with significantly different coefficients of thermal expansion. The single crystal structure of the boron doped silicon has the further advantage of being non-magnetic and more chemically stable and inert as compared to metals and polycrystalline materials. It is also more mechanically stable than such materials.

The sense element as described up to this point is illustrated by FIG. 6 as sense element 8'. However, another aspect of the claimed invention will now be described which is not part of the embodiment illustrated in FIG. 6.

Inasmuch as the sensitivity of sense element 8 corresponds to the respective masses of upper plates 38 and 40, it is advantageous for said upper plates to be as large as possible. However, turning to FIGS. 4 and 5C, it will be seen that the gap 48 between deflectable body 12 and upper surface 14 is very small relative to the dimensions of upper plates 38 and 40. Indeed, gap 48 will be approximately 1 to 10 microns. As a result, substantial damping effects result from the tendency of the air to resist displacement when 'squeezed' between surface 14 and upper plates 38 and 40.

While the prior art teaches that "compromises among sensitivity, resonant frequency, and damping of undesirable resonances" are required of all accelerometer designs, it also teaches that increased sensitivity generally results in "lowered resonance frequency ... [where] ... the lowest resonance limits the available measurement bandwidth." See "A Monolithic Silicon Accelerometer With Air Damping And Over Range Protection", P. W. Barth et al.; Proceeding of IEEE Solid-State Sensor And Actuator Workshop, 1988, 88th 0215-4, pp. 35–38, hereby incorporated by reference. Sense element 8', however, as illustrated in FIG. 6, has a desirable sensitivity but a damping ratio which produces a measurement bandwidth which is too narrow and a natural frequency which is too low. Such "response" characteristics are undesirable because the sensor response is too slow and is not responsive to the desired frequency components of an acceleration signal. This is particularly true with respect to sense elements for accelerometers intended for use in automotive crash sensors for air bag deployment.

Thus, although a desirable sensitivity has been achieved, the measurement bandwidth of the embodiment illustrated in FIG. 6 is too narrow and the natural frequency too low for some applications.

Turning to FIG. 2, to achieve a sense element having desirable sensitivity as well as particular response characteristics, a plurality of openings 50 is extended through the deflectable body 12. Preferably, the plurality of openings 50 will extend through the thickness 17 of those portions of deflectable body 12 which rotate in response to an acceleration normal to upper surface 14. The openings 50 will thus most preferably extend through upper plates 38 and 40. Note that although FIG. 2 illustrates the plurality of openings 50 as individual circular holes 51, other shapes and configurations are possible.

Turning to FIGS. 4 and 5C, it can be seen that the individual holes 51 can be seen. Note that the holes are most preferably staggered as illustrated by the phantom holes 51' in FIG. 4. The individual holes 51 may also be seen in FIG. 5C. Note, that a greater number of holes having relatively small diameters from 0.1 to 50μ is much preferred compared to fewer holes of greater diameter. The greater the diameter of the individual holes 51, the greater the chance that errors in the total capacitance will result. Those skilled in the art will appreciate that manufacturing control of large holes is more difficult than for small. Thus, most preferably, the diameter of individual holes 51 will be minimized and from about 0.1 to 50μ.

The use of a sense element structure incorporating the plurality of openings 50 achieves multiple effects not possible in previous prior art sense element structures. Unlike the internal opening 32 which surrounds the pedestal 30 and is necessary to allow the deflectable body 12 to rotate about flexure axis 28, the plurality of holes 50 change the mass and the total moment of upper plates 38 and 40. As a result, the natural frequency is increased and the measurement bandwidth widened.

However, in addition to changing the mass, the plurality of openings 50 also affects the air flow of the air surrounding sense element 8. The 'viscous' air previously trapped between the upper plates 38 and 40 and surface 14 can now flow upward through the individual openings 51. As a result, the overall damping ratio of sense element 8 is decreased and the speed of the sensor response increased. A final advantage of using the plurality of openings 50 is that the number and size of openings 51 can be easily controlled during manufacture so as to achieve a particular set of desired response characteristics.

As a result of this unique balance between sensitivity and response characteristics, the sense element 8 will not be responsive to its resonance frequency of about 1–5 KHz in the working atmosphere discussed below.

Another significant advantage of sense element 8, is that the high damping ratio produces a sense element with increased shock survivability. When sense element 8 is dropped no deformation or damage should occur to deflectable upper body 12. This effect is supplemented by the substantial resistance of the boron-doped silicon to suffer plastic deformation caused by mechanical stress. It is anticipated that the sense element disclosed herein will survive not only the rigors of use, but also the traditional hazards associated with the manufacturing of the sense element and the subsequent processing required for its final incorporation into an accelerometer used in a crash sensor, automobile, airplane, etc. It is intended that the disclosed structure and composition result in a sense element 8 which suffers no loss of sensitivity from mechanical shocks and will maintain it's original state without deformation or damage which would reduce the sensitivity and/or accuracy of the device. Ideally, in the event of a shock of sufficient magnitude the sense element 8 will break so as to be non-functional rather than function and thus provide inaccurate signals, while deformed or bent.

As previously mentioned, a significant advantage of the claimed sense element over prior art sense elements is the efficient and cost effective manufacturing process used to make it. This method of making itself contributes to a sense element 8 with increased strength and higher reliability than prior art sense elements. The method of manufacturing the claim sense element will now be disclosed with the use of FIGS. 3, 3A–C, 4, 4A and 5A–C. Note that while these figures illustrate the process of manufacturing from three different views of sense element 8, they do not attempt to illustrate every step of the manufacturing process. Also, the dimensions of certain aspects of the drawings have been exaggerated for the purposes of clarity. Thus, the aspect ratios of the device are not intended to be illustrated therein.

Figure 3A:
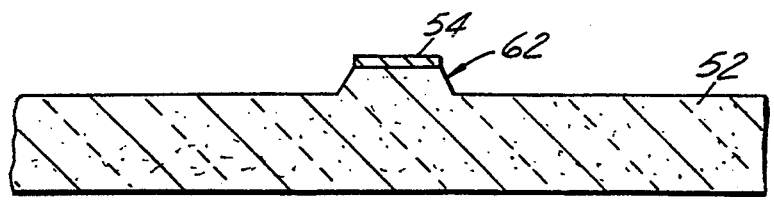
FIGS. 3A–3C illustrate the sense element of FIG. 3 at three stages in the process of manufacturing.
Figure 3B:
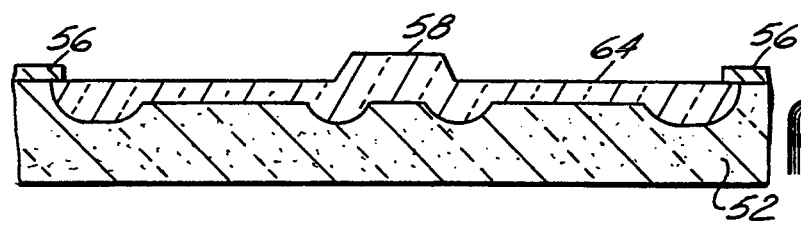
Figure 3C:
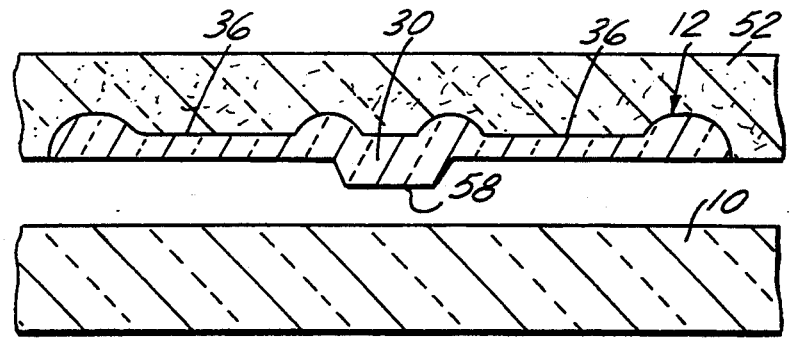

Turning to FIGS. 3A and 5A, the method of manufacturing sense element 8 begins with the selection of a single crystal silicon wafer 52 preferably having a 100 crystal orientation and polished on a single side. Although FIGS. 3A and 5A only show wafer 52 after the first etch stop, those skilled in the art will appreciate that the original state of such wafers are known. Wafer 52 is initially from 0.3 mm to 0.7 mm thick, with a diameter from 75 mm to 200 mm or greater. Most preferably the thickness of the wafer 52 will be about 0.4–0.5 mm. The thickness should increase with increasing diameter.

After conventional cleaning, the wafer 52 is thermally oxidized to form a silicon dioxide ($SiO_2$) layer with a thickness of approximately 1,000 to 7,000 Å and most preferably 3000 to 4,000 Å. The $SiO_2$ layer will serve as a mask for a subsequent anisotropic silicon etch. The wafer 52 is then patterned using conventional photolithographic techniques so as to leave $SiO_2$ portion 54 where desired. After conventional cleaning a hydrofluoric acid dip is used to remove any 'native' $SiO_2$ which may have grown on $SiO_2$ portion 54.

Silicon wafer 52 is then etched in anisotropic etchant such as a KOH/NaOH solution, to remove a thin section of bulk silicon not covered by $SiO_2$ portion 54. Approximately 0.5 to $10\mu$ of silicon, preferably $5.0\mu$, will be removed. A preferred anisotropic etchant is a KOH/NaOH solution containing three kilograms KOH and 0.316 kilograms NaOH in 6 liters of deionized water. Wafer 52 remains in contact with the isotropic etchant solution for a time of sufficient duration to provide the desired recess. Preferably, the wafer 52 will remain in contact with the solution for between 5 to 30 minutes at 70° to 90° C. and preferably for 10 to 20 minutes at 60° C. Most preferably the contact will be for about 15 to 17 minutes at 60° C. The resulting structure 62 is pictured in FIG. 3A. Note that the dotted line in FIG. 5A shows the original thickness of silicon wafer 52 prior to the isotropic etch stop.

$SiO_2$ portion 54 is then stripped using concentrated hydrofluoric acid. Remaining silicon wafer 52 and structure 62, see FIGS. 3A and B, are then cleaned and a diffusion mask of silicon nitride deposited. This diffusion mask is deposited using conventional low pressure chemical vapor deposition (LPCVD) techniques and should have a thickness from 300 Å to 3,000 Å and preferably a thickness of 500–1500 Å. Using conventional photolithographic techniques, a mask is patterned on the silicon nitride layer and followed by a plasma etch to remove silicon nitride from those areas where boron diffusion is desired. Silicon nitride mask 56 may be seen in FIGS. 3B, 4A and 5B.

Note that careful control of mask opening 68 in FIG. 5B is necessary to achieve a satisfactory balance between maximization of the mass of upper plates 38 and 40 and the torsional rigidity/strength of torsion arms 36. The torsional rigidity of torsion arms 36 is approximately inversely proportional to the cube of the thickness of torsion arms 36. However, the shape of the torsion arms 36 also influences this characteristic. The cross sectional shape of torsion arms 36 is a function of the diffusion mask openings and the diffusion process itself. In general, the width of mask opening 68 should always be less than the boron diffusion depth 70 of the "bulk" areas 72 which will become main body 34 and upper plates 38 and 40. In the bulk areas 72 the boron diffusion depth is independent of the mask opening 74. However, with respect to mask opening 68, the depth of the boron diffusion is dependent on the size of mask opening 68. Thus control of mask openings 68 and 74 allows for greater control in the formation of torsion arms 36 and hence greater control of sense element 8's sensitivity to acceleration.

The control of silicon nitride mask opening 74 does influence the depths of the lateral and vertical boron diffusion in the bulk areas 72. Lateral diffusion produces rounded edges 76, as illustrated in FIGS. 5B, 5C and 7. Although the aspect ratios in the drawings have been exaggerated for the purposes of clarity, the lateral boron diffusion depth 80 should approximate the vertical boron diffusion depth 82. In turn, the lateral diffusion depth 80 should approximate the distance 84 that silicon nitride mask portion 56 "overhangs" the bulk area 72. This relationship is illustrated in FIG. 7.

After additional cleaning of silicon nitride mask 56, boron is diffused into silicon wafer 52 to the solid solubility limit at the surface 64 of exposed silicon wafer 52. It is desirable to saturate the silicon surface 64 with the maximum possible number of boron atoms. Most preferably a two step boron diffusion will be used wherein the first step saturates the silicon with the desired amount of boron atoms and a second succeeding diffusion step distributes said boron such that a desired distribution of boron atoms in the silicon wafer 52 is achieved. The desired amount of boron atoms will at a minimum be approximately equal the thickness of the deflectable body $12 \times 1 \times 10^{19}$ cm$^{-3}$. The final concentration of boron must be at least $1 \times 10^{19}$ cm$^{-3}$ or the desired structure of deflectable body 12 will not be achieved. Preferably the first diffusion step will take place at approximately 1,000° to 1,200° C. for about 0.5 hours to 10 hours in the presence of N$_2$ and a small amount of O2 (1 to 10%) and a commercially available source of boron. Most preferably the first step will comprise 6 hours at 1150° C. A preferred boron source is "Boron-Plus" available from Owens-Illinois of Toledo, Ohio, U.S.A. The second boron distribution step is also termed a diffusion step and is preferably a heating process consisting of 0.5 to 10 hours at 900°–1200° C. Most preferably, the second diffusion or distribution step will consist of 3.5 hours at 1000° C.

After the removal of silicon nitride mask 56, the surface 58 is anodically bonded to glass substrate 60. Although those skilled in the art will be familiar with anodic bonding processes, the article, "*Mechanisms of Anodic Bonding of Silicon to Pyrex TM Glass*" by K. Albaugh et al., 1988 IEEE SOLID-STATE SENSOR AND ACTUATOR WORKSHOP PROCEEDING, 88TH0215-4, pages 109–110 is hereby incorporated by reference.

The bonding of surface 58 to substrate 60 is followed by a bulk silicon etch wherein most of the remaining silicon wafer 52 is removed. This is achieved with the use of an isotropic or anisotropic etchant solution. A suitable etchant will remove the majority of bulk silicon wafer 52. A suitable etchant solution will be a KOH solution comprised of three kilograms of KOH in seven liters of deionized water. The wafer remains in contact with the etchant solution for a period of 1.0 to 5.0 hours at a temperature from 70°–100° C. and most preferably 2.5 hours at 90° C. for a wafer having an initial thickness of 0.4–0.5 mm. The bulk etch is followed by a selective etch in a solution comprised of three kilograms of KOH in seven liters deionized water saturated with isopropyl alcohol. This solution contacts the remaining wafer until such time as the wafer 52 is clear, i.e. until the glass substrate 60 is visible, followed by an additional 0.5 to 2. hours contact with the solution and most preferably 0.75 hours.

After the final etching of silicon from the boron doped deflectable upper body 12, conventional photolithographic techniques are used to pattern the desired metal bonding pads and conductors discussed above. Note that prior to the anionic bonding, conventional photolithographic and deposition techniques are used to deposit chromium and platinum on glass substrate 60 to form fixed conductive plates 16 and 18.

Although the manufacture of the claimed sense element 8 has been disclosed, it will be appreciated by those skilled in the art that the claimed sense element will subsequently be incorporated into an accelerometer. It is most preferred that the final atmosphere in which the sense element is contained be comprised of at least 95% N$_2$ gas and be substantially free of water vapor. While the sense element 8 will function in other atmospheres, the N$_2$ atmosphere ensures that the viscosity of the atmosphere is constant and does not affect the desired response characteristics, particularly the damping ratio.

Turning to FIG. 1, those skilled in the art will appreciate that more than one of the sense element 8 of the instant invention can be utilized to provide the most preferred, fully differential accelerometer sense element 86. Such a construction allows for the various relative comparisons of the four capacitors such that the use of a reference voltage is unnecessary.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

I claim:

1. A sense element having a measurement bandwidth with a natural frequency, comprising:
    a substantially planar substrate;
    a semiconductive body positioned above and parallel to the substrate and rotatable about a flexure axis located above and parallel to the substrate, and having a plurality of openings extending the body, the openings producing a damping which modifies the natural frequency and the measurement bandwidth of the sense element, said semiconductive body capable of rotation about said flexure axis responsive to acceleration of said sense element.

2. The sense element of claim 1 which has a measurement bandwidth from 0 to 5000 Hz.

3. The sense element of claim 2 wherein the plurality of openings result in a damping ratio from 2 to 10 and a measurement bandwidth from 0 to 300 Hz.

4. The sense element of claim 1 where the openings extend through the body in a direction perpendicular to the substrate and have individual diameters from 0.1 to 50μ.

5. The sense element of claim 1 wherein the semiconductive body further comprises an interconnected first upper plate and second upper plate through which the plurality of openings extend.

6. The sense element of claim 5 further comprising:
    at least two fixed conductive plates attached to the substrate; and
    the semiconductive body further including:
        a pedestal attached to the substrate and surrounded by an internal opening in the body; and
        a pair of oppositely directed torsion arms connecting the body to the pedestal and forming a flexure axis around which the first and second upper plates deflect in response to said acceleration normal to the sense element;
    wherein the first and second upper plates register with the fixed conductive plates to form a first and second capacitor and the deflection of the upper plates responsive to said acceleration produces a difference between the capacitances of the first and second capacitors.

7. The sense element of claim 6 where the semi-conductive body is comprised of boron doped silicon.

8. The sense element of claim 5 wherein the first and second upper plates have non-identical masses controlled by the size and number of openings extending therethrough.

9. A capacitive sense element for an accelerometer, comprising:
 a dielectric substrate having at least two fixed conductive plates thereon;
 a boron-doped silicon body positioned above and parallel to the substrate, the body comprising:
 a pedestal attached to the substrate and surrounded by an internal opening in the body;
 a first upper plate and a second upper plate corresponding to the fixed conductive plates to form a first and a second capacitor; and
 a pair of oppositely directed torsion arms connecting the body to the pedestal and forming a flexure axis around which the first and second upper plates deflect in response to an acceleration normal to the sense element to produce a difference between the capacitances of the first and second capacitors.

10. The sense element of claim 9 with a measurement bandwidth and a natural frequency wherein the first and second upper plates have a plurality of openings extending therethrough.

11. The sense element of claim 9 which displays no hysteresis or plastic deformation in response to a change in said acceleration.

12. The sense element of claim 9 where the semiconductive body is nonmagnetic.

13. The sense element of claim 12 where the semiconductive body is comprised of boron doped silicon.

14. The sense element of claim 13 where the concentration of boron is greater than $1 \times 10^{19}$ cm$^{-3}$.

15. The sense element of claim 9 where the total moment of the first upper plate about the flexure axis is greater than the total moment of the second upper plate around the flexure axis such that the body deflects in response to said acceleration normal to the substrate.

16. A method of manufacturing a capacitive sense element for an accelerometer having a frequency response with a natural frequency, comprising the steps of:
 providing a dielectric substrate having at least two fixed conductive plates thereon;
 forming a boron doped silicon body comprising:
 a pedestal surrounded by an internal opening in the body;
 a first upper plate and a second upper plate of boron doped silicon; and
 a pair of oppositely directed torsion arms crossing over the internal opening to connect the pedestal to the body; and
 attaching the body to the substrate.

17. The method of claim 16 wherein the step of forming the body further comprises forming a plurality of openings extending through the upper plates.

18. The method of claim 16 wherein the method of manufacturing further comprises:
 providing a silicon wafer;
 forming the boron doped silicon body in the silicon wafer; and
 removing the boron doped silicon body from the silicon wafer.

19. The method of claim 16 where the boron-doped silicon body has rounded edges.

20. The method of claim 16 which produces a sense element which displays no hysteresis in response to changes in acceleration.

21. A sense element for an accelerometer having a measurement bandwidth with a natural frequency, comprising:
 a substantially planar substrate having at least two fixed conductive plates; and
 a boron-doped silicon body positioned above and parallel to the substrate and rotatable about a flexure axis located above and parallel to the substrate, the boron-doped silicon body comprising:
 a pedestal attached to the substrate and surrounded by an internal opening in the body;
 an interconnected first upper plate and second upper plate a pair of oppositely directed torsion arms connecting the body to the pedestal and forming a flexure axis around which the first and second upper plates deflect in response to an acceleration normal to the sense element;
 a plurality of openings extending through the interconnected first upper plate and second plate, the opening producing a damping which modifies the natural frequency and the measurement bandwidth of the sense element; and
 wherein the first and second upper plates register with the fixed conductive plates to form a first and a second capacitor and the deflection of the upper plates produces a difference between the capacitances of the first and second capacitors.

* * * * *